Aug. 1, 1933. M. L. FOX 1,920,192
REMOTE CONTROL DEVICE FOR SHOCK ABSORBERS
Filed Oct. 31, 1931 2 Sheets-Sheet 1
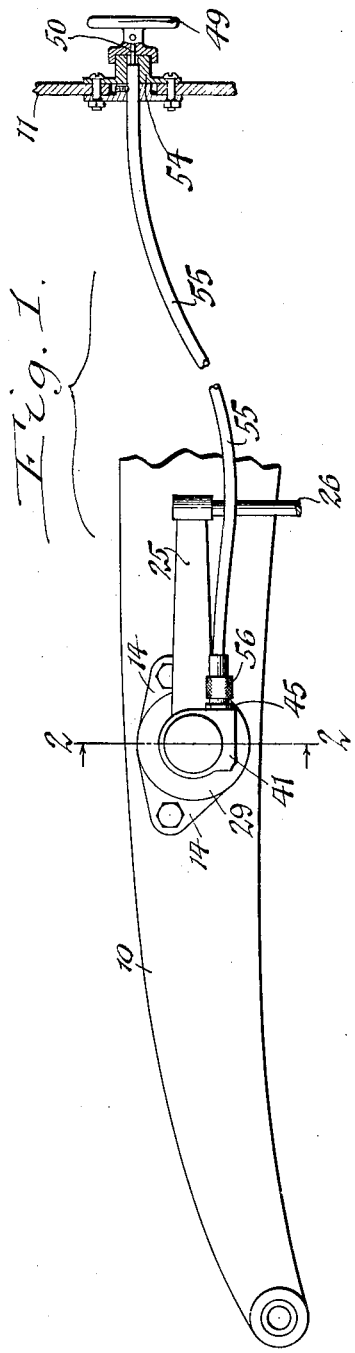
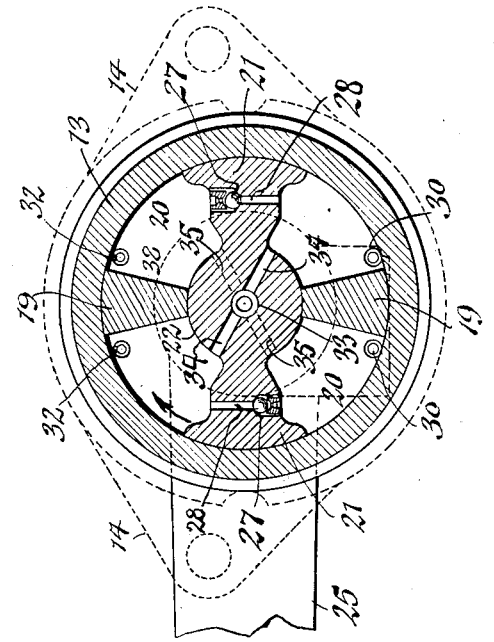
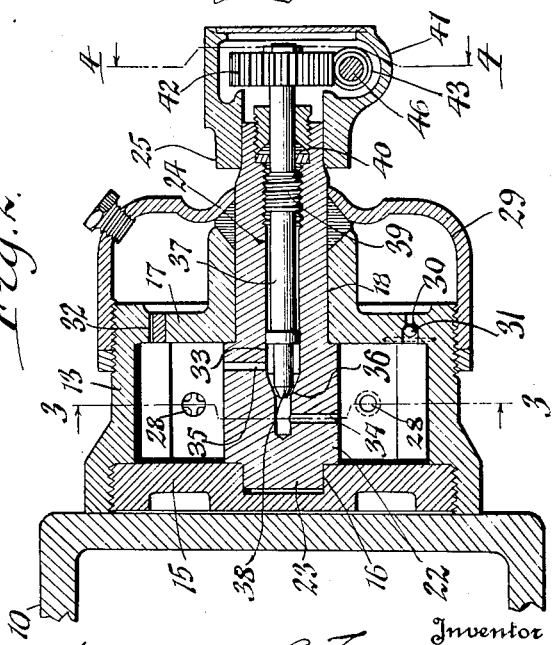
Inventor
Merritt L. Fox
By Charles F. Hill
Attorneys

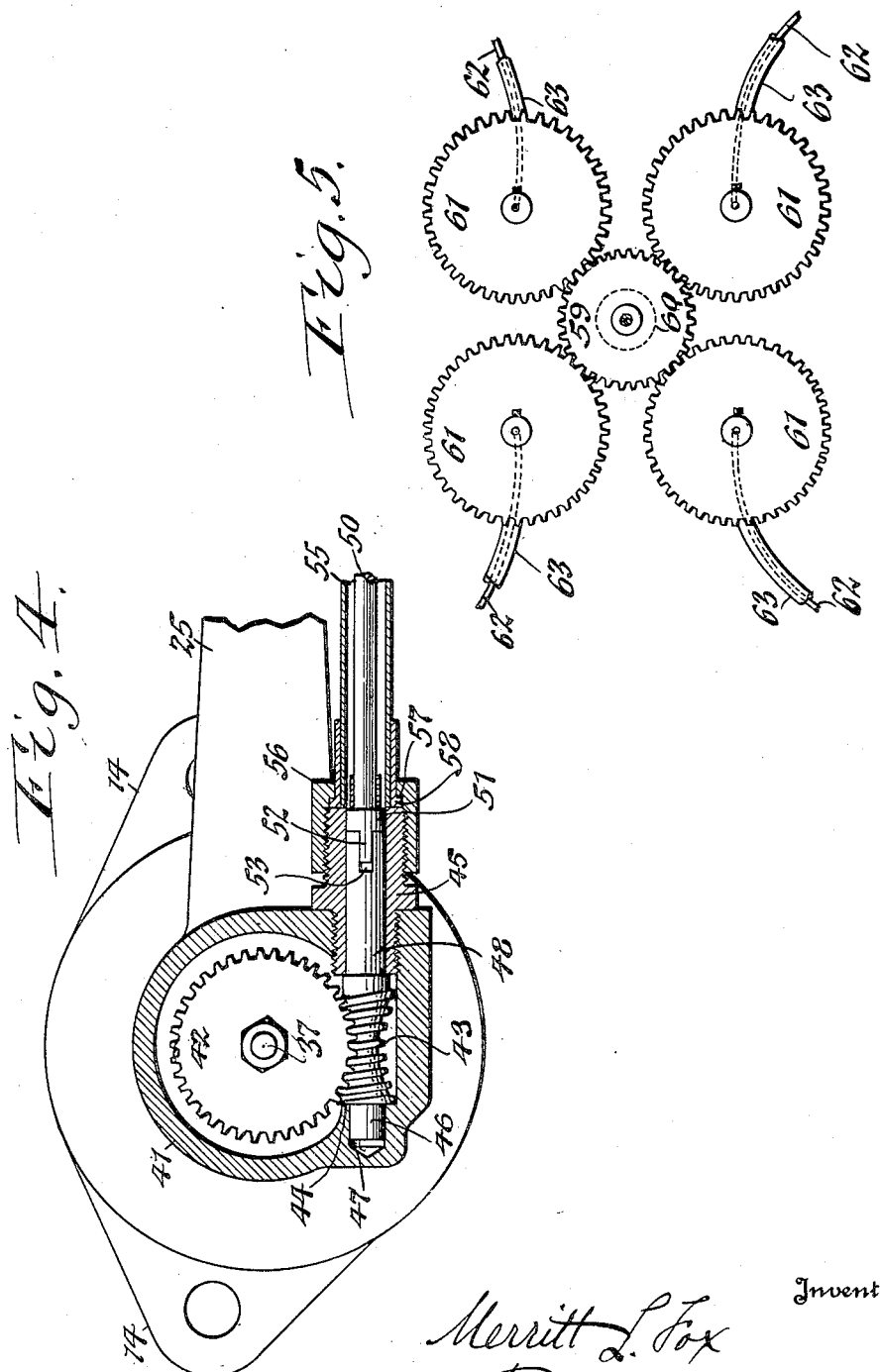

Patented Aug. 1, 1933

1,920,192

UNITED STATES PATENT OFFICE 1,920,192

REMOTE CONTROL DEVICE FOR SHOCK ABSORBERS

Merritt L. Fox, Buffalo, N. Y., assignor to Houde Engineering Corporation, Buffalo, N. Y., a Corporation of New York Application October 31, 1931. Serial No. 572,291

4 Claims. (Cl. 188—87)

This invention relates to a remote control adjusting device for liquid shock absorbers whereby the latter may be adjusted at will from a point located at a distance from the absorbers.

A device of this character is particularly useful in connection with the shock absorbers of automobiles in which case it is often desirable to vary the resistance to shock when running over long stretches of a highway some of which is smooth or even and therefore permits of reducing the resistance of the absorber in order to obtain an easy and comfortable ride, while traveling over rough or uneven sections of the road, the resistance of the absorbers should be increased in order to save the car and its passengers from undue jars or shocks.

It is the purpose of this invention to provide a remote control device for adjusting shock absorbers from a distance readily and conveniently at will in order to either increase or decrease the resisting or absorbing effect in accordance with variations in roadway conditions and to accomplish this by means which are exceedingly simple and compact in construction, reliable in operation and capable of addition to standard types of shock absorbers now on the market without requiring any material alteration in the same, or increasing the cost of the same to any great extent.

In the accompanying drawings:

Figure 1 is a fragmentary side elevation of a shock absorber equipped with my invention and mounted on the frame and instrument board of an automobile.

Figure 2 is a vertical section taken lengthwise through the absorber on line 2—2 Fig. 1, and on an enlarged scale.

Figure 3 is a vertical section taken transversely through the absorber, on an enlarged scale.

Figure 4 is a vertical transverse section, on an enlarged scale, taken on the correspondingly numbered line in Fig. 2.

Figure 5 is a diagrammatic view showing the manner of adjusting a plurality of shock absorbers simultaneously from the same locality.

In the following description similar characters of reference indicate like parts in the several figures of the drawings:

In Figs. 1 and 2 of the accompanying drawings this invention is shown in connection with the frame 10 of an automobile which is movable vertically relatively to the axles of the running gear while the automobile is in operation and this shock absorber is controlled or regulated at a point remote from the absorber by means which are mounted on the instrument board 11 within convenient reach of the operator and are operatively connected with the shock absorber so that the latter can be regulated or adjusted for varying the resistance or shock absorbing capacity of the same either while the automobile is at rest or is in operation on a roadway.

This invention is capable of use in liquid or hydraulic shock absorbers of various forms but is shown in the drawings for illustrative purposes in connection with a hydraulic shock absorber of the Houdaille type, which in its general organization is constructed as follows:

The body of the shock absorber comprises a cylindrical wall 13 which is provided on opposite sides with attaching lugs 14 connected with the outer side of the automobile frame 10, a rear head 15 connected with the rear end of the cylindrical wall 13 and provided with a central bearing 16, a front head 17 connected with the front end of the cylindrical wall and provided with a central bearing 18.

Within this body is formed a cylindrical space which is divided by diametrically opposite partition sections 19 into two working chambers 20, 20 which are adapted to contain a resistance liquid. In these working chambers two diametrically opposite pistons 21 oscillate, which pistons are connected to opposite sides of a hub 22, which latter is provided on its rear side with a short stub shaft 23 journaled in the bearing 16 and on its front side this hub is provided with a forwardly projecting long operating shaft 24 which is journaled in the bearing 18. At its front end the operating shaft is connected with an operating arm or lever 25 which latter is connected by means of a link 26 with the adjacent axle of the automobile or other member of the running gear which moves relatively to the frame or body of the car for the purpose of operating the shock absorber and causing the shock between these parts of the automobile to be cushioned or absorbed.

During the forward movement of the pistons in the working chambers, as indicated by the direction of the arrow in Fig. 3, the liquid in front of each of these pistons is prevented from passing through the respective piston to the rear side thereof by a check valve 27 which closes a port 28 in this piston, but during the return or backward stroke of each piston this check valve moves away from its seat in said port and permits the liquid to move with comparative freedom from the high pressure end of the respective working chamber to the low pressure end of the same. By this means a comparatively light shock absorbing or cushioning effect is produced while the axle and frame of the automobile are moving one toward the other, but a heavier shock absorbing effect is produced while said axle and frame are moving one away from the other during the rebound of the spring system which is interposed between the frame of the car and the axles of the running gear.

Liquid may be supplied to each of the working chambers from a replenishing chamber 29 arranged on the front end of the body through a port 30 arranged in the lower part of the front head 17 and controlled by a check valve 31 which opens toward the respective working chamber. Any air which may be trapped in the upper part of either of the working chambers is permitted to escape into the upper part of the replenishing chamber through vents 32 formed in the upper part of the front head 17.

Regulation of the shock absorbing effect of the absorber to suit different loads and other conditions is effected by means which permit some of the liquid to pass back and forth from one end of each working chamber to the opposite end thereof, the amount of such liquid capable of passing back and forth in this manner being regulated according to the amount of cushioning effect which it is desired to obtain from the absorber.

The specific means shown in the drawings for accomplishing this regulating effect are constructed as follows:

The numeral 33 represents a longitudinal bore or valve chamber formed axially in the hub 22 and operating shaft 24 and opening through the front end of this shaft while its rear end is connected by means of ports 34 with the working chambers on the rear sides of the pistons and also connected by means of ports 35 with the working chambers in front of said pistons, and said valve chamber or bore being provided intermediate of the ports 34 and 35 with a valve seat 36.

Within the valve chamber is arranged a valve stem 37 which is provided at its rear end with a valve 38 movable toward and from the valve seat 36 and provided on its intermediate part with an external screw thread 39 which engages with an internal screw thread on the intermediate part of the bore of the operating shaft 24. Upon turning the valve stem 37 in one direction or the other a longitudinal movement is imparted to the same due to the screw connection 39 between the same and the operating shaft thereby moving the regulating valve 39 relative to the seat 36 and thus regulating the freedom of flow of the resistance liquid from one end of each working chamber to the other and thereby changing the shock absorbing or cushioning effect of the instrument accordingly. A leak-tight joint is produced between the outer part of the valve stem and the front end of the operating shaft by a packing 40 which may be of any suitable construction.

Means are provided whereby the adjustment of the valve stem may be effected from a point which is remote from the instrument and thereby enable the shock absorbing or cushioning effect of the instrument to be regulated while the car is in operation.

Means are provided to suit different conditions which may be experienced in riding over roads varying in roughness or smoothness and also to adjust the cushioning effect of the absorber to suit variation in loads which may be carried by the automobile from time to time as the same traverses the highway, such as would be liable to occur in a bus line in which the number of passengers at times changes constantly as passengers are taken on and let off. The particular form of remote control device for liquid shock absorbers shown in the drawings as a satisfactory embodiment of the present invention is constructed as follows:

The numeral 41 represents a housing or casing which encloses the outer or front end of the valve stem 37 and is preferably formed on the adjacent part of the hub of the operating lever 25. Within this housing and secured to the front end of the valve stem 37 is a worm wheel 42, the lower part of which meshes with a worm 43 also arranged within the housing. This worm is held against movement lengthwise of its axis by engagement of its inner or front end with a shoulder 44 on the inner end of the housing while the rear end of the worm engages with a bushing 45 screwed into the outer end of the housing and said worm is mounted for rotation about its axis by means of a shaft having its inner end 46 journaled in an inner bearing 47 on the housing while the outer end 48 of this shaft is journaled in the bore of the bushing 45 which forms a bearing therefor.

Rotation of the worm 43 is effected from a point within convenient reach of the operator by means of a rotary handle 49 mounted on the instrument board 11 and a flexible shaft 50 which is permanently connected at one end with the hub of the handle 49 while its opposite end is detachably connected with the outer end 48 of the worm shaft by a coupling which preferably consists of a head 51 arranged at the rear end of the flexible shaft 50 and provided with a longitudinal tenon 52 engaging with a longitudinal groove or slot 53 in the outer end of the shaft section 48, as best shown in Fig. 4. The handle 49 is preferably journaled on a bearing bracket 54 on the instrument board 11 and the flexible shaft 50 is protected and maintained in its proper position by a flexible tubular sheath 55 of any suitable construction which surrounds the flexible adjusting shaft 50 and is secured at its front end to the bracket 54, while its rear end is detachably connected with the bushing 45 by means of a coupling sleeve 56 having a screw connection with the bushing 45 and provided with a shoulder 57 which engages with the corresponding shoulder 58 on the rear end of the flexible tubular sheath 55, as best shown in Fig. 4.

Upon turning the handle 49 this motion is transmitted by the flexible shaft to the worm which latter, due to its meshing the worm wheel 42, causes the valve stem 37 to be turned, thereby causing the screw connection between the valve stem and the operating shaft 24 to move the regulating valve 38 relative to its seat 36 and effect an adjustment in the amount of liquid which may flow back and forth between the opposite ends of the working chambers, in accordance with the desired cushioning or absorbing effect which is required to suit varying load and road conditions.

During such adjustment of the valve stem 37 the same moves lengthwise and to permit this the teeth of the worm wheel 42 are made wide enough so that they can move transversely of the worm 43 the requisite extent without becoming disengaged therefrom, and the space between the front and rear walls of the enclosing casing 41 is wide enough to permit ample movement of the worm wheel 42 corresponding to the movement of the valve 38 toward and from its seat 36.

This adjustment can be easily and conveniently effected while the operator is occupying his usual place behind the instrument and while the car is traversing the road and thereby enables the operator to readily vary the cushioning or shock absorbing effect of the instrument as the condition of the road varies from time to time and the load on the car either increases or decreases.

After the regulating valve has been adjusted the same will not be disturbed by the operation of the absorber inasmuch as the worm and worm wheel forming parts of the regulating mechanism are incapable of being moved by the oscillation of the operating arm 25 upon which the same are mounted and the flexible shaft 50 and flexible sheathing 55 between the housing 41 of the operating arm, and the handle or finger piece 49 on the instrument board permits of these relatively stationary and oscillating parts to perform their respective functions without disturbing the operative conection between the handle 29 and the regulating valve within the absorber.

The means for detachably connecting the flexible adjusting shaft 50 with the worm and also detachably connecting the flexible tubular sheath with the housing permits these parts to be readily assembled and dismembered for inspection, adjustment and repairs whenever this may be required.

For the purpose of enabling all four of the shock absorbers on an automobile at the front and rear ends thereof to be simultaneously adjusted to suit varying conditions, means are provided which are shown in Fig. 5 and are constructed as follows:

The numeral 59 represents a central master gear wheel which is mounted on the instrument board similar to the manner in which the hand wheel 49 is journaled on the instrument board in Fig. 1, which master wheel is provided with a knob, finger-piece or handle 60 for rotating the same. Meshing with different teeth on the periphery of this master gear wheel are four driven gear wheels 61, each of which is also pivotally mounted on the dash or instrument board 11 similar to the manner in which the handle 49 is mounted, as shown in Fig. 1, and each of these driven gear wheels has its hub connected with a flexible transmitting shaft 62 which is connected with the worm 43 of one of the shock absorbers similar to the means employed for this purpose in Figs. 2 and 4, each of these flexible shafts being also enclosed by a flexible tubular sheath 63 in the manner shown in Figs. 1, 2 and 4.

By turning the master gear wheel 59 in one direction or the other the several driven gear wheels 61 will turn simultaneously in the proper direction for causing the regulating valves 38 of the several shock absorbers to be moved relatively to their seats 36, thereby causing the cushioning or shock absorbing effect of the several absorbers to be maintained uniform at all times regardless of whether the cushioning effect is increased or decreased. The possibility of an unbalanced condition due to lack in uniformity in the shock absorbers is therefore avoided. If, however, it is desired to increase or decrease the shock absorbing or cushioning effect of one or two absorbers relative to the other absorbers when a plurality of them are coupled in this manner, as for example in an automobile which is intended to carry a heavier load in the rear than in the front, then an individual adjustment of each shock absorber can be made which will best suit it for the particular load it is intended to carry and thereafter simultaneous adjustment can be effected by the means shown in Fig. 5.

I claim as my invention:

1. A liquid shock absorber comprising a body adapted to be mounted on a movable support and having a working chamber containing a resistance liquid, a piston movable in said working chamber and having a hub and an operating shaft extending axially from said hub, said hub having a regulating passage connecting with said working chamber and having a valve seat, and said shaft having a bore communicating with said regulating passage and provided with a screw thread, a valve stem arranged in said bore and having a valve movable toward and from said valve seat and also having a screw thread engaging the thread of said shaft, a worm wheel connected with said valve stem, a worm meshing with said worm wheel, and a support which is arranged on said shaft and on which said worm is journaled.

2. A liquid shock absorber comprising a body adapted to be mounted on a movable support and having a working chamber containing a resistance liquid, a piston movable in said working chamber and having a hub and an operating shaft extending axially from said hub, said hub having a regulating passage connecting with said working chamber and having a valve seat, and said shaft having a bore communicating with said regulating passage and provided with a screw thread, a valve stem arranged in said bore and having a valve movable toward and from said valve seat and also having a screw thread engaging the thread of said shaft, a worm wheel connected with said valve stem, a worm meshing with said worm wheel, and formed on a worm shaft having an inner end and an outer end, a housing enclosing said worm wheel and worm and mounted on said operating shaft and having an inner bearing in which the inner end of said worm shaft is journaled, a bearing bushing which is secured to said housing and in which the outer end of said worm shaft is journaled, a rotary handle, a relatively fixed support provided with a bearing on which said handle is journaled, a flexible shaft connected at one end with said handle, a coupling head arranged at the opposite end of said flexible shaft and detachably connected with said worm by a cooperating tongue and groove formed respectively on said head and worm, and a flexible tubular sheath surrounding said flexible shaft.

3. In a liquid shock absorber comprising a body adapted to be mounted on a movable support and having a working chamber containing a resistance liquid, a piston movable in said working chamber and having a hub and an operating shaft extending axially from said hub, said hub having a regulating passage connecting with said working chamber and having a valve seat, and said shaft having a bore communicating with said regulating passage provided with a screw thread, a valve stem arranged in said bore and having a valve movable toward and from said valve seat and also having a screw thread engaging the thread of said shaft, a worm wheel connected with said valve stem, a worm meshing with said worm wheel and formed on a worm shaft having an inner end and an outer end, a housing enclosing said worm wheel and mounted on said operating shaft and having an inner bearing in which the inner end of said worm shaft is journaled, a bearing bushing which is secured to said housing and in which the outer end of said worm shaft is journaled, a rotary handle, a relatively fixed support provided with a bearing for said handle, a flexible shaft connected at one end with said handle, and a coupling head arranged at the opposite end of said flexible shaft and detachably connected with said worm by a tongue and groove coupling.

4. A liquid shock absorber comprising a body adapted to be mounted on a movable support and having a working chamber containing a resistance liquid, a piston movable in said working chamber and having a hub and an operating shaft extending axially from said hub, said hub having a regulating passage connecting with said working chamber and having a valve seat, and said shaft having a bore communicating with said regulating passage provided with a screw thread, a valve stem arranged in said bore and having a valve movable toward and away from said valve seat and also having a screw thread engaging the thread of said shaft, a worm wheel on said valve stem, a worm meshing with said worm wheel, an arm secured to and extending from said shaft and being enlarged to form a housing for enclosing said worm wheel and forming a bearing for said worm, and means for turning said worm.

MERRITT L. FOX.